United States Patent [19]

Milner, Jr.

[11] 3,947,191

[45] Mar. 30, 1976

[54] LIGHTWEIGHT HIGH STRENGTH BOOM CONSTRUCTION

[76] Inventor: Edwin Earl Milner, Jr., 103 Meadowrue Court, Williamsburg, Va. 23185

[22] Filed: June 25, 1974

[21] Appl. No.: 483,069

[52] U.S. Cl. .................... 403/334; 403/109; 182/2; 212/144

[51] Int. Cl.² .................... F16B 7/10

[58] Field of Search ........... 182/2; 52/731; 403/333, 403/334, 109, 383, 404, 363; 212/144, 17; 214/145

[56] References Cited

UNITED STATES PATENTS

| | | | |
|---|---|---|---|
| 1,974,458 | 9/1934 | Hallquist | 214/145 |
| 2,910,190 | 10/1959 | Baas | 212/144 |
| 3,276,182 | 10/1966 | Handley | 52/731 |

FOREIGN PATENTS OR APPLICATIONS

| | | | |
|---|---|---|---|
| 747,235 | 3/1933 | France | 52/731 |

*Primary Examiner*—Andrew V. Kundrat
*Attorney, Agent, or Firm*—Mason, Fenwick & Lawrence

[57] ABSTRACT

An articulated boom of high strength to weight ratio is disclosed including an inner steel boom of modified trapezoidal cross-section including a top web, inclined opposed side webs and an arcuately curved bottom web; a pivotal elbow connector is mounted on the outer end of the inner boom and supports the inner end of a tapered hollow fiberglass shell defining an outer boom member of inverted modified trapezoidal cross-section including a top wall having progressively decreasing width from its inner to its outer end, opposed side walls which progress inward from top to bottom with the degree of inward taper decreasing from the inner end to the outer end of the outer boom and with the lower ends of the side walls being connected by an arcuate, downwardly convex hollow connector wall opposite the top wall.

20 Claims, 11 Drawing Figures

LIGHTWEIGHT HIGH STRENGTH BOOM CONSTRUCTION

BACKGROUND AND OBJECTS OF THE INVENTION

This invention is in the field of multi-section booms, such as telescoping booms and articulated booms and component sections of such booms, and is particularly directed to a unique articulated boom structure providing safe, reliable support and dielectric isolation for a personnel supporting basket at the outer end of the boom.

Utility companies, outdoor advertising companies and other companies having operations requiring the positioning of workmen or other personnel at elevated levels for installation, servicing or repairing of equipment frequently employ maintenance trucks on which power operated boom members having personnel supporting baskets at their outer ends are mounted. Normally, the inner end of such boom members is mounted for rotational movement about a vertical axis by a supporting pedestal or the like and is also mounted for pivotal movement about a horizontal axis on the pedestal. In many instances, the boom members are dimensioned and shaped to have adequate structural strength and capacity to enable support by the boom of relatively heavy auxiliary equipment such as ground drilling auger means for drilling pole holes or the like. Additionally, it is important that boom members employed by electrical companies and others for use in areas in close proximity to high voltage equipment employ a dielectric section electrically isolating the outer boom end and personnel supporting basket from the remainder of the structure in order to minimize the extremely dangerous possibility of creating a short circuit through the boom to the ground should any part of the outer boom portion accidentally contact a high voltage conductor.

It is desirable that boom members be dimensioned and constructed so as to permit the outer end of the boom to be easily positionable throughout a work area of substanial extent without repositioning of the boom supporting vehicle. It is also obviously imperative that such boom members have sufficient strength and structural integrity as to provide a substantial safety factor for the users.

Previous boom constructions have frequently employed a telescopic type construction in which two or more relatively axially movable boom members are mounted for extensible movement of the outer boom member outwardly from within the inner boom members. Other prior known constructions have disclosed articulated boom members in which the outer boom portion, which may or may not comprise a telescopic boom section, is pivotally connected to the outer end of an inner boom member which is pivotally supported on a pedestal in the well-known manner previously discussed.

All workmen supporting boom members must have adequate strength to safely support the weight of the workmen and associated equipment being employed by the workmen as well as having adequate strength to resist lateral and vertical inertia forces created by the stopping and starting of the boom movement during a positioning operation. It is desirable that a boom provide adequate resistance to stress conditions resulting from bending, buckling, shear forces and combination forces while providing such adequate resistance without employing excessively heavy and consequently cumbersome structural members. It is also desirable that boom members occupy a minimum amount of space when contracted on the supporting vehicle for transport from one job site to another.

Unfortunately, boom designs providing advantages in one area frequently suffer a consequent loss of a desirable characteristic in another area and an optimum boom design must consequently reflect a proper relative proportioning of conflicting design factors.

Therefore, it is the primary object of this invention to provide a new and improved boom construction having optimum functional characteristics.

A more specific object of the invention is the provision of a new and improved articulated boom construction.

Yet another object of the invention is the provision of a new and improved boom construction having design simplicity enabling achievement of economy both in fabrication and maintenance of the boom member.

A still further object of the invention is the provision of a new and improved boom construction having an improved strength to weight ratio.

Another object of the invention is the provision of a new and improved boom component usable either alone or as part of a compound boom structure.

Yet another object of the invention is the provision of a new and improved articulated boom construction having no internal parts requiring maintenance or servicing.

Achievement of the foregoing objects is enabled by the preferred embodiment of the invention as embodied in an articulated boom consisting of an inner steel boom member and an outer fiberglass boom member each of which is of unique design.

The inner boom is supported on its lower or inner end by a pivotal connection to a horizontal pivot shaft on a conventional support pedestal. The inner boom is formed of a hollow steel shell member of modified trapezoidal cross-section consisting, when considering the longitudinal axis of the inner boom positioned substantially horizontally, of a top web, a bottom web and first and second side webs joined along their lower edge portion by the bottom web to corresponding edge portions of the companion side webs. The first and second side webs are inclined in downwardly convergent relation with respect to a vertical plane passing through the axis of the inner boom member so that their edges connected to the bottom web are more closely spaced with respect to each other than are their edge portions connected to the top web. The side webs are symmetrical with respect to the vertical plane and the bottom web is arcuately curved about a center of curvature positioned within the interior of the hollow boom member.

A horizontal pivot pin mounted near the outer end of the inner boom member provides pivotal support for a steel elbow connector means including a boom support stub member extending outwardly from the pivot shaft. Support for the outer boom member is provided by the boom support stub member by virtue of the fact that the inner end of the outer boom member comprises a hollow coupling portion fitting over the stub member. In the preferred embodiment, the coupling portion is formed on the stub member during the fabrication of the entire boom on a mandrel on which the stub member is mounted. In an alternate mode of fabrication, the entire outer boom is fabricated by conventional procedures and the coupling portion is secured to the stub member by epoxy or other suitable adhesive or by mechanical securing means. The remaining portions of the outer boom member include a top wall, side wall and a bottom connector wall portion.

The top wall tapers inwardly from the inner to outer end of the outer boom and side walls taper inwardly from top to bottom with the amount of taper decreasing from the inner end to the outer end of the boom member so that the side walls at the outer end of the boom are in parallel relation with respect to each other. The bottom wall of the outer boom member is of arcuate, downwardly convex configuration having a center of curvature interiorly of the boom.

The prior known boom constructions have largely been of either rectangular cross-section or of circular cross-section, or of upwardly convergent trapezoidal configuration formed of metal truss members, insofar as the main boom elements are concerned. The boom of the present invention has been fully developed to provide an optimum cross-sectional configuration of the boom elements which provides substantial strength and weight advantages as compared to the prior known boom configurations.

In addition, the preferred embodiment employs a hydraulic cylinder mounted between the outer end of the inner boom member and the elbow connector in a space-saving manner for enabling a pivoting of the boom members with respect to each other.

Prior known fiberglass booms of rectangular cross-section have frequently employed an inefficient excessive amount of material due to the fact that they are designed with a very high safety factor insofar as resistance to bending stresses is concerned. It has been found that a substantially more efficient use of material can be achieved by the present invention which is based upon the provision of an appropriate shape for providing a properly balanced resistance to all stresses in an efficient manner.

Analysis of boom members having different geometric shapes and lengths established the substantial advantages of the present invention over the prior known boom constructions.

A better understanding of the manner in which the preferred embodiment achieves the foregoing objects and results will be enabled when the following written description is considered in conjunction with the appended drawings.

DETAILED DESCRIPTION OF A PREFERRED EMBODIMENT

Figures 1, 2:
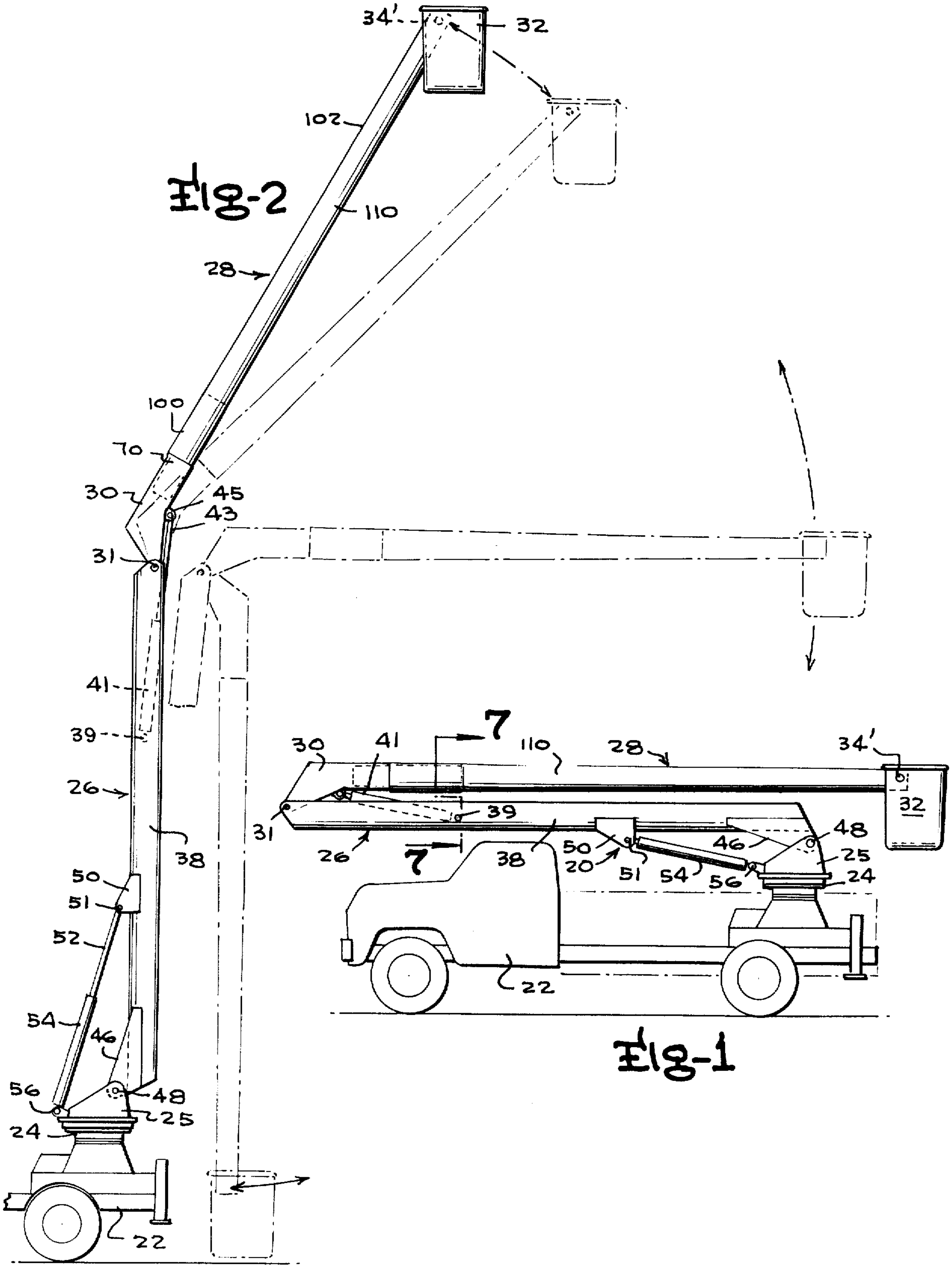
FIG. 1 is a side elevation view of the preferred embodiment as mounted in folded position on a conventional truck.
FIG. 2 is a side elevation view illustrating the preferred embodiment in a vertically extending position and illustrating intermediate positions in dashed lines.

Attention is initially invited to FIG. 1 of the drawings which illustrates the preferred embodiment of the invention, generally designated at 20, mounnted on a conventional supporting vehicle in the form of a truck 22 by means of a conventional pedestal type support means 24 having vertically oriented ear plates 25. Support means 24 is mounted for rotation about a vertical axis extending coaxially through the support means in a manner well-known to those of skill in the art.

The articulated boom structure constructed in accordance with the preferred embodiment consists of three primary elements; a first or inner hollow boom member 26, a second or outer boom member 28 and a pivotal connector means 30 fixedly connected to the inner end of the outer boom member 28 and mounted for pivotal movement about boom support pivot pin 31 on the outer end of the first hollow boom member 26. A workman's basket or platform 32 is mounted for movement about pivot axis 34 adjacent the outer end of the outer boom member by any well-known basket mount or by the basket mounts of my prior U.S. Pat. Nos. 3,590,948 and 3,295,633.

Figures 7, 8, 9, 10, 11:
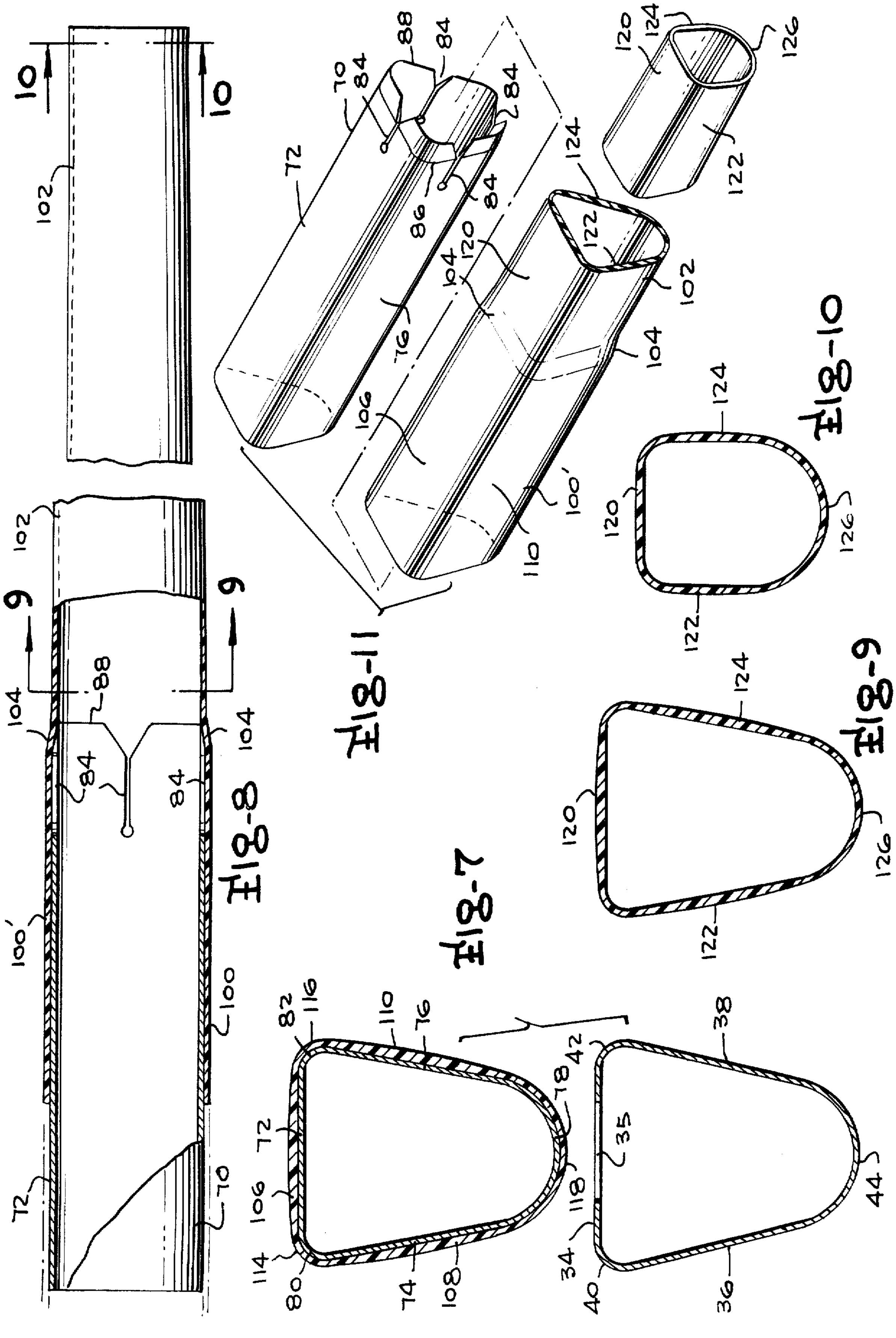
FIG. 7 is a sectional view taken along lines 7—7 of FIG. 1.
FIG. 8 is a side elevation with portions removed of the outer boom member and the boom support stub shaft as mounted in an alternative manner.
FIG. 9 is a sectional view taken along lines 9—9 of FIG. 8.
FIG. 10 is a sectional view taken along lines 10—10 of FIG. 8.
FIG. 11 is an exploded perspective view of the outer boom member and the boom support stub shaft of FIG. 8.

The first or inner hollow boom member 26 is formed of steel having a substantially uniform cross-section throughout the greater part of its length. More specifically, boom 26 cross-sectionally, comprises top web 34 (when viewed in horizontal position as shown in FIG. 1), a first side web 36 and a second side web 38 respectively joined by curved corner junction portions 40 and 42 to the opposite sides of the top web 34 as best illustrated in FIG. 7. The first and second opposed side web members 36 and 38 lie in downwardly converging planes inclining from top to bottom symmetrically with respect to the vertical center plane through the inner boom axis as illustrated in FIG. 7. An arcuately curved bottom web 44 connects the edges of the side webs 36 and 38 opposite top web 34 with the center of curvature of the bottom web 44 being positioned equidistantly between the first and second side web members 36 and 38 in the interior of the boom member.

Support for the inner boom 26 is provided by side bracket plates 46 welded to the inner end portions of side web members 36 and 38 with the inner ends of the bracket plates 46 being supported for pivotal movement about a horizontal pivot pin 48 on the upstanding ear plates 25 of the support means 24. An anchoring bracket 50 for an end of a hydraulic cylinder unit is welded to the inner boom 26 at an intermediate position as shown in FIG. 2. A pivotal connection 51 connects bracket 50 to the outer end of a piston rod 52 extending from hydraulic cylinder 54 and the base end of hydraulic cylinder 54 is connected by a pivot pin 56 to the pedestal support means 24.

Outer boom supporting pivot shaft 31 is mounted in the outer end of the first hollow boom member 26 and provides pivotal support for the steel elbow connector means 30 which includes an outer boom support stub member 70 (FIGS. 3 and 7) in the form of a rigid sleeve or shell of substantially uniform cross-section. Stub sleeve 70 includes a top panel 72, first and second opposed side panels 74 and 76 which are downwardly convergent symmetrically relative to the vertical center plane and join downwardly convex bottom connector portion 78 having a center of curvature equidistantly spaced between the panels 74 and 76 on the interior of the stub sleeve as best illustrated in FIG. 7. Connection between the upper ends of the side panels 74 and 76 and the top panel 72 is respectively provided by curved corner junction portions 80 and 82.

Flexure slots 84 (FIG. 3) extend inwardly from the outer end of the boom support stub sleeve 70 and the wall portion of the stub sleeve at its outermost end tapers inwardly from a transverse plane indicated by line 86 to define a sharp outer edge 88 as illustrated in FIG. 11. Slots 84 provide a degree of flexibility of the outer end portions of the stub shaft 70 for preventing high concentrations of stress and pressure between the outer end of the stub sleeve and the boom member 28 during use of the boom.

Figure 3:
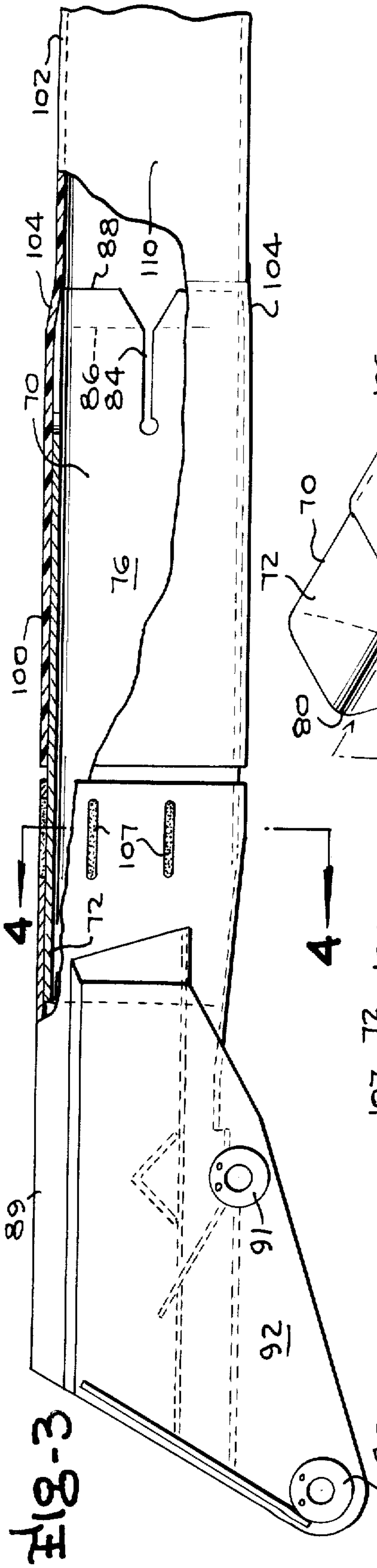
FIG. 3 is a fragmentary side elevation, with portions removed, of the outer boom member and the boom support stub shaft assembly and the pivotal elbow connector means.

Outer boom 28 is formed of a unitary filament wound fiberglass shell and consists of a coupling portion 100 defining the innermost end of the outer boom which is matingly formed over the boom support stub member 70 in the manner best illustrated in FIG. 3. In the preferred mode of fabrication, the stub member 70 is positioned on a mandrel and uncured resin saturated fiberglass is wound on the mandrel and the stub shaft 70 to form the outer boom 28 and simultaneously effect a bonding of the boom to stub shaft 70 to provide a strong unitary structure.

Boom 28 includes an outer boom portion 102 connected to coupling portion 100 by means of a transition connector portion 104 (FIG. 3) having an inwardly converging configuration from the coupling portion 100 to the outer boom portion 102.

Figure 6:
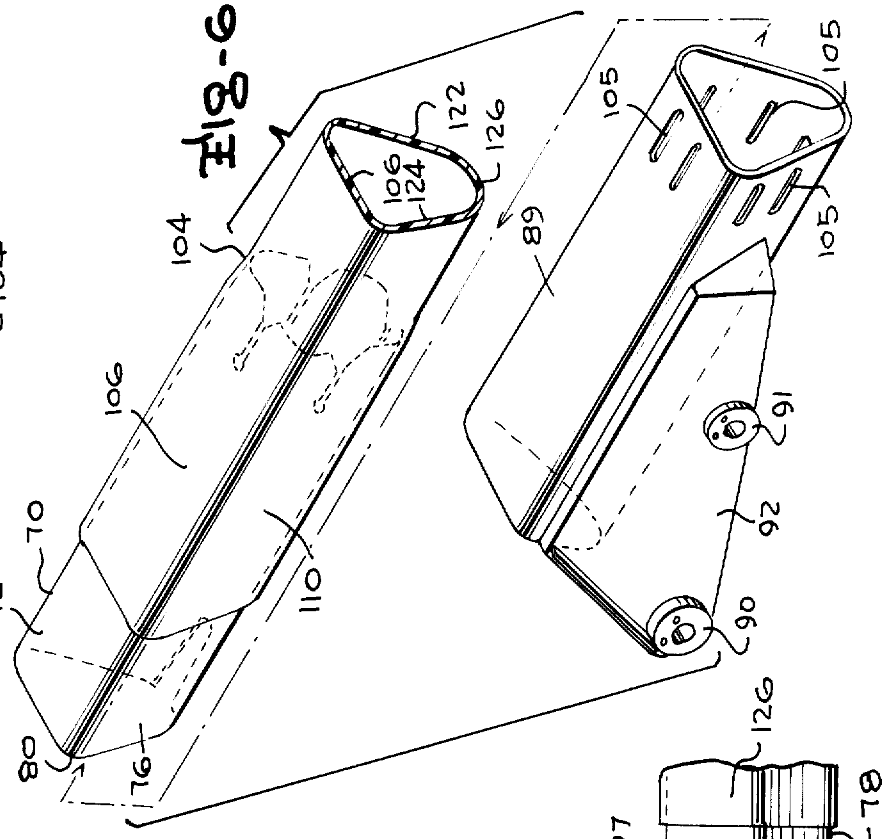
FIG. 6 is an exploded fragmentary perspective view of portions of the outer boom, the boom support stub shaft and the pivotal elbow connector means.
Figure 4:
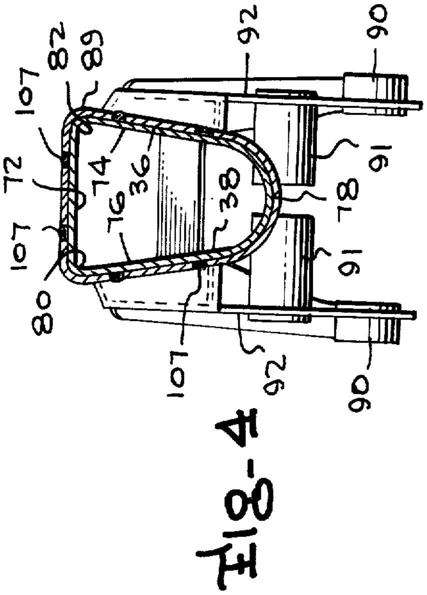
FIG. 4 is a sectional view taken along lines 4—4 of FIG. 3.
Figure 5:
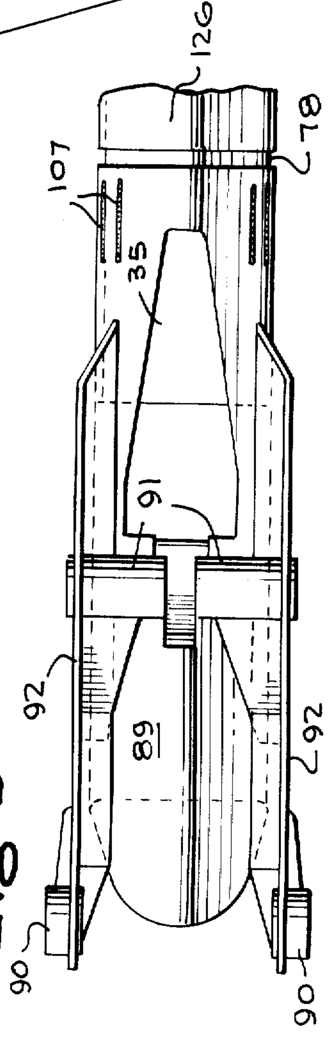
FIG. 5 is a bottom plan view of a portion of FIG. 3.

The inner end of stub member 70 is matingly received for fixed support in a socket formed in the outer end of a hollow support tube 89 of the pivotal connector member 30. Slots 105 (FIG. 6) are provided in the socket portion of member 30 to enable permanent attachment of the stub member by welding in the slots as shown at 107 in FIG. 3. Support bearings 90 are provided on the inner end of pivotal connector means 30 for enabling mounting of the connector on pivot pin 31. Similarly, bearings 91 are provided outwardly of bearings 90 as shown in FIG. 6 with the bearings being mounted in ear frame members 92 welded to opposite sides of a tube 89 in which stub member 70 is received.

The outer boom of FIG. 8 is identical to the outer boom of FIG. 3 with the single exception of the fact that the boom of FIG. 8 is separately formed with a connector portion 100' (FIG. 11) slightly larger than stub member 70 over which it is subsequently positioned for retention by conventional means such as epoxy adhesive or the like. Therefore, it should be understood that the following description of the outer boom applies to both embodiments.

Coupling portion 100 includes a top wall 106 and first and second opposed side walls 108 and 110 respectively joined to the top wall 106 by curved corner junction portions 114 and 116 as shown in FIG. 7. The bottom of the coupling portion of the outer boom comprises an arcuately curved, downwardly convex bottom wall 118 having a center of curvature located in the interior of the coupling portion and equidistantly spaced between the opposed side walls 108 and 110.

Outer boom portion 102 is cross-sectionally in the form of a modified trapezoid including a top wall 120 having a gradually narrowing or decreasing width progressing from its inner end to its outer end as illustrated in FIG. 11 and as also emphasized by comparison of FIGS. 9 and 10. In addition, the outer boom portion also includes first and second opposed side walls 122 and 124 disposed along compound surface paths defined by lateral surfaces which progress from a cross-section near the inner end having downwardly converging symmetrically inclined sides through sections or progressively decreasing angles of downward convergence having a uniform rate of change to a section having parallel vertical sides at the outer end of the boom portion. Otherwise stated, the degree of downward and inward convergence of the side walls 122 and 124 progressively decreases from the inner end to the outer end of the outer boom portion to reach a state of vertical parallelism at the outer end as shown in FIGS. 10 and 11.

An arcuate bottom connector wall portion 126 extends between the lower ends of the side walls 122 and 124 as illustrated in FIGS. 9 and 10. In addition, it is to be noted that the bottom connector wall portion 126 is of constant width and uniform radius of curvature throughout its length and is of convex uniform curvature about a center of curvature equidistantly spaced in an axial plane between the opposed side walls 122 and 124 within the interior of the outer boom portion. While the bottom connector wall portion 126 is of lessor width than the width of the top wall 120 for the greater portion of the length of the outer boom portion, it reaches a condition of equal width to the top wall 120 adjacent the outer end of the outer boom portion as seen in FIG. 10. The foregoing relationship is due to the gradually decreasing width of the top wall progressing from the inner end to the outer end of the outer boom.

The special configuration of the outer boom herein disclosed provides significantly improved resistance to flexural buckling and shear stress in a fiberglass reinforced plastic boom section which has especially improved resistance to buckling when compared to conventional boom configurations presently employed for molded fiberglass or similar insulative boom sections.

Relative pivotal positioning of the inner boom with respect to the outer boom is enabled by means including a hydraulic cylinder 41 connected to a pivot shaft 39 extending between the first and second side webs 36 and 38 of inner boom 26. A piston rod 43 extending from the opposite end of hydraulic cylinder 41 is pivotally connected to the pivotal connector means 30 by a connector pin 45 mounted in bearings 91 so that actuation of cylinder 41 serves to pivot the pivotal connector means 30 about the boom support pivot shaft 31 as illustrated by the various solid and dotted line positions of the components in FIG. 2.

The inner hollow boom member 26 and the outer boom member 28 are movable between a folded position illustrated in FIG. 1 and an extended position illustrated in solid lines in FIG. 2 in which the outer boom member is oriented at an obtuse angle with respect to the inner boom member 26.

A slot 35 (FIG. 7) in the outer end of the top web 34 of the first hollow boom member 26 provides clearance for the cylinder 41 to enable the operation of the cylinder through all positions of adjustment in which portions of the cylinder extend outwardly of the boom member. Moreover, slot 35 enables a close spacing of boom members 26 and 28 in the folded position illustrated in FIG. 1. Consequently, the nearly complete total enclosure of the cylinder 41 results in a very neat appearance as shown in FIG. 1 without any substantial loss of functional efficiency of the cylinder.

The superiority of the subject boom constuction over the prior art is made evident by analytic comparison of a boom of the cross-section illustrated in FIG. 9 with a rectangular boom having rounded corners and of the same maximum width and height and the same wall thickness as the FIG. 9 boom. Analysis of such booms indicates that the boom of FIG. 9, while being lighter than the rectangular boom, has a greater safety factor with respect to elastic buckling under dead static loads, dead plus live static loads and dynamic loads than does the boom of rectangular configuration. Additionally, the boom having the cross-section of FIG. 9 has a greater safety factor with respect to compression under static loads, dead plus live static loads and dynamic loads than does the boom of the rectangular cross-sectional configuration.

Numerous modifications of the preferred embodiment will undoubtedly occur to those of skill in the art; for example, the individual boom sections 26 and 28 are capable of use alone or in other type compound boom constructions such as telescopic devices. Therefore, it should be clearly understood that the spirit and scope of the invention is to be limited solely by the appended claims. I claim:

1. A hollow boom member having an inner end and an outer end formed of an elongated hollow shell member including an inner end comprising a coupling portion dimensioned and shaped to be attached to a boom support member and an outer boom portion extending outwardly from said coupling portion and comprising a top wall having progressively decreasing width from its inner end to its outer end, opposed side walls having downward convergence with the degree of downward convergence of said opposed side walls progressively decreasing from the inner end to the outer end of said outer boom portion and a curved bottom connector wall portion of downwardly convex configuration at all transverse section planes of the boom member extending between lower portions of said opposed side walls.

2. The invention of claim 1 wherein said bottom connector wall portion comprises an arcuately curved member having a substantially constant radius of curvature and a center of curvature positioned internally of said boom.

3. The invention of claim 2 wherein the progressive decrease in the downward convergence of said opposed side walls of the outer boom portion is such that diametrically opposed portions of said side walls are parallel at the outer end of the outer boom portion.

4. The invention of claim 1 wherein said bottom connector portion comprises an arcuately curved member having a substantially constant radius of curvature and a center of curvature positioned internally of said boom and additionally including curved corner junction portions of said shell member formed between the upper edge portions of said opposed side walls and opposite edge portions of said top wall.

5. The invention of claim 1 wherein said coupling portion comprises a top wall, opposed side walls lying in downwardly converging planes symmetrical to a vertical plane through the center axis of the boom member when in horizontal position and a curved bottom wall extending between lower edge portions of said opposed side walls of the coupling portion.

6. The invention of claim 1 wherein said coupling portion comprises a top wall, opposed side walls lying in downwardly converging planes symmetrical to a vertical plane through the center axis of the boom member when the boom is in a horizontal position and a curved bottom wall extending between lower edge portions of said opposed side walls of the coupling portion and additionally including a transition connector portion of said shell member of converging configuration from the outer end of said coupling portion to the inner end of said outer boom portion.

7. The invention of claim 1 wherein said bottom connector portion comprises an arcuately curved member having a center of curvature positioned internally of said boom and also having a substantially constant radius of curvature along its length, said coupling portion comprises a top wall, opposed side walls lying in downwardly converging planes symmetrical to a vertical plane through the center axis of the boom member when the boom is in a horizontal position and a curved bottom wall extending between lower edge portions of said opposed side walls and additionally including a transition connector portion of said shell member of converging configuration from the outer end of said coupling portion to the inner end of said outer boom portion.

8. The invention of claim 1 wherein said bottom connector portion comprises an arcuately curved member having a center of curvature internally of said boom and also having substantially constant radius of curvature along its length, said coupling portion comprises a top wall, opposed side walls lying in downwardly converging planes symmetrical to a vertical plane through the center axis of the boom member when the boom is in a horizontal position and a curved bottom wall extending between lower edge portions of said opposed side walls and additionally including a transition connector portion of said shell member extending with converging configuration from the outer end of said coupling portion to the inner end of said outer boom portion and curved corner junction portions between the upper edge portions of said opposed side plates and opposite edge portions of said top plate.

9. The invention of claim 5 wherein said curved bottom wall extending between lower edge portions of said opposed side walls of said coupling portion is arcuately curved and has a center of curvature internally of said boom.

10. The invention of claim 9 wherein said curved bottom wall has a substantially constant radius of curvature along its length.

11. The invention of claim 10 wherein the progressive decrease in the downward convergence of said opposed side walls of the outer boom portion is such that diametrically opposed portions of said side walls are parallel at the outer end of the outer boom portion.

12. The invention of claim 1 wherein said coupling portion is of substantially constant cross-section along its length and comprises a top wall, opposed side walls having convergence from top to bottom and an arcuately curved bottom wall extending between lower edge portions of said opposed side walls.

13. The invention of claim 1 wherein said coupling portion is of substantially constant cross-section along its length and comprises a top wall, opposed side walls having convergence from top to bottom and an arcuately curved bottom wall extending between lower edge portions of said last-mentioned opposed side walls and wherein the side walls of the outer boom portion at the outermost end of said outer boom portion are mutually parallel and perpendicular to the top wall.

14. The invention of claim 13 wherein said arcuately curved bottom wall has a center of curvature internally of said boom.

15. A hollow boom member in the form of an elongated hollow shell member of integral tubular configuration having an inner end portion and an outer portion terminating in an outer end, the inner end portion being adapted to be coupled to boom support means, and the outer portion extending over a major portion of the axial length of the boom member, said outer portion comprising a top wall of a width which progressively decreases from said inner end portion to said outer end, a pair of downwardly converging opposed side walls integrally joined along uppermost portions to side portions of said top wall and having a lower termination located along parallel lines in a common plane, each of said parallel lines being equidistantly spaced on opposite sides of a vertical plane passing through the axis of the boom in horizontal position, a curved bottom connector wall portion extending in a downwardly curving arcuate path unitarily and integrally from lower portions of said opposed side walls, said top wall at the innermost end of said outer portion being of a width greater than the width of said curved bottom connector wall and said top wall further being of less width at its outer end than at its inner end.

16. The invention of claim 15 wherein said arcuately curved bottom connector wall portion has a constant cross-section along its length.

17. The invention of claim 15 wherein said curved bottom connector wall portion defines a cylindrically convex bottom surface along the length of the boom.

18. A hollow boom member in the form of an elongated hollow shell member of integral tubular configuration having an inner end portion and an outer portion terminating in an outer end, the inner end portion being adapted to be coupled to boom support means, and the outer portion extending over a major portion of the axial length of the boom member, said outer portion comprising a top wall, a pair of downwardly converging opposed side walls integrally joined along uppermost portions to side portions of said top wall and having a lower termination located along parallel lines in a common plane, each of said parallel lines being equidistantly spaced on opposite sides of a vertical plane passing through the axis of the boom in horizontal position, a curved bottom connector wall portion extending in a downwardly curving arcuate path unitarily and integrally from lower portions of said opposed side walls, said top wall at the innermost end of said outer portion being of a width greater than the width of said curved bottom connector wall and said top wall further being of less width at its outer end than at its inner end and wherein said side walls at successive transverse section planes progressing outwardly along said shell member comprise downwardly converging rectilinear wall portions of progressively decreasing angles of convergence and reaching substantially vertical parallelism at the outer end of said shell member.

19. The invention of claim 18 wherein said arcuately curved bottom connector wall portion has a constant cross-section along its length.

20. The invention of claim 18 wherein said curved bottom connector wall portion defines a cylindrically convex bottom surface along the length of the boom.

* * * * *